United States Patent
Guionnet et al.

(10) Patent No.: US 12,137,034 B2
(45) Date of Patent: Nov. 5, 2024

(54) SYNCHRONIZED ADAPTATION OF A VIRTUAL SUBSET OF A NETWORK DEDICATED TO A SERVICE

(71) Applicant: Orange, Issy-les-Moulineaux (FR)

(72) Inventors: Chantal Guionnet, Chatillon (FR); Sylvie Jumpertz, Chatillon (FR); Catherine Benguigui, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 18 days.

(21) Appl. No.: 17/784,606

(22) PCT Filed: Dec. 14, 2020

(86) PCT No.: PCT/FR2020/052415
§ 371 (c)(1),
(2) Date: Nov. 22, 2022

(87) PCT Pub. No.: WO2021/116634
PCT Pub. Date: Jun. 17, 2021

(65) Prior Publication Data
US 2023/0135831 A1 May 4, 2023

(30) Foreign Application Priority Data
Dec. 13, 2019 (FR) ...................................... 1914422

(51) Int. Cl.
*H04L 41/122* (2022.01)
*H04L 41/0823* (2022.01)

(52) U.S. Cl.
CPC ........ *H04L 41/122* (2022.05); *H04L 41/0823* (2013.01)

(58) Field of Classification Search
None
See application file for complete search history.

(56) References Cited

U.S. PATENT DOCUMENTS

2018/0248815 A1    8/2018   Cui et al.
2021/0021647 A1*   1/2021   Cai ..................... H04L 65/1026
2021/0084523 A1*   3/2021   Kucera ................. H04W 28/06

FOREIGN PATENT DOCUMENTS

WO   WO 2018/200733 A1   11/2018

OTHER PUBLICATIONS

Huawei, "Editorial change for use case reorganization", vol. SA WG5, No. West Palm Beach, Florida (US); 20170508-20170512, Apr. 28, 2017, 3GPP Draft: S5-173143 PCR 28.801 Editorial Change for Use Case Reorganization, $3^{rd}$ Generation Partnership Project (3GPP), Mobile Competence Centre; 650, Route Des Lucioles; F-06921 Sophia-Antipolis, Retrieved from the Internet: http://www.3gpp.org/ftp/tsg_sa/WG5_TM/TSGS5_113/Docs/ retrieved on Apr. 28, 2017.

(Continued)

*Primary Examiner* — Atta Khan
(74) *Attorney, Agent, or Firm* — Knobbe, Martens, Olson & Bear, LLP (57) ABSTRACT

A synchronized adaptation of a virtual subset of a telecommunication network, referred to as a "network slice", dedicated to an elementary service of a set of services is disclosed. A more encompassing service is generally composed of several elementary services to which separate respective slices are dedicated. The telecommunication network includes a plurality of network slices, and these slices are configured according to a plurality of configuration parameters. In particular, at least one second configuration parameter of at least one second slice dedicated to a second elementary service of a set of services is modified on the basis of at least one modification of a first configuration parameter of a first slice dedicated to a first elementary service of the set of services.

16 Claims, 4 Drawing Sheets

(56) References Cited

OTHER PUBLICATIONS

International Search Report for International Application No. PCT/FR2020/052415, dated Mar. 23, 2021.

* cited by examiner

SYNCHRONIZED ADAPTATION OF A VIRTUAL SUBSET OF A NETWORK DEDICATED TO A SERVICE

CROSS-REFERENCE TO RELATED APPLICATIONS

This application is filed under 35 U.S.C. § 371 as the U.S. National Phase of Application No. PCT/FR2020/052415 entitled "SYNCHRONISED ADAPTATION OF A VIRTUAL SUBSET OF A NETWORK DEDICATED TO A SERVICE" and filed Dec. 14, 2020, and which claims priority to FR 1914422 filed Dec. 13, 2019, each of which is incorporated by reference in its entirety.

BACKGROUND

Field

This description relates to the field of telecommunication networks.

Description of the Related Technology

The architecture of mobile telecommunication networks has been standardized until now. This is particularly the case with what are referred to as "2G", "3G", and "4G" mobile networks, in which the different telecommunication network architectures are traditionally based on very specific equipment dedicated to certain specific functionalities, whether in the access network or in the core network.

The lack of flexibility and scalability inherent in this type of conventional architecture has led to consider the adoption of more flexible architectures for the next generation of mobile networks, referred to as "5G", in order to be able to respond quickly to extremely diverse demands in terms of traffic or quality of service.

Among the solutions considered, one of the solutions is based on a technique of virtual network slicing.

The concept of network slicing is intended to support communication services for specific needs, specific users, or specific terminals, by applying suitable means of traffic management.

From the customer's point of view, a network slice is defined by values of network parameters which allow satisfying requirements related to the service to be provided. The network slices deployed by an operator are not all composed of the same network parameter values, or even of the same network parameters, as the idea is to adapt the network slices to the usage requirements related to this network slice. A network slice thus makes it possible to satisfy user demand according to various functional, operational, and performance criteria, such as speed, latency, number of connected terminals, coverage, cost, etc.

For example, an implemented network slice linked to IoT services ("Internet of Things") may require managing a large number of terminal connections but a rather low speed associated with each terminal. According to another example, a service offered to business customers instead requires advanced security and availability parameters.

Each network slice, as viewed by such a user-customer (or "customer" hereafter), is therefore independent of the other slices. Each slice is therefore the equivalent of a virtual private network, and in theory its adaptations have no impact on the characteristics of the other slices.

The independence of network slices is therefore one of the strengths of 5G because it allows the customer to see, manage, and adapt them one by one, according to the service with which each is associated. When a user (typically a customer who is a major account) defines a more encompassing product or service (e.g. a connected self-driving car) for end customers, it generally consists of several different functional services, also called elementary services, and therefore requires several network slices with different characteristics in order to address the needs of each of these independent services.

Subsequent adaptation of a network slice for evolving needs is then carried out independently from that of the other network slices.

When the needs of the more encompassing product or service, or of a customer, requires quickly modifying many network slices, this independence between network slices can become a disadvantage rather than an advantage.

The present disclosure improves the situation.

SUMMARY

A method is proposed for the synchronized adaptation of a virtual subset of a telecommunication network (R) referred to as a "network slice", dedicated to an elementary service of a set of services, a more encompassing service being composed of several elementary services to which separate respective slices are dedicated, the telecommunication network (R) comprising a plurality of network slices, said slices being configured according to a plurality of configuration parameters, the method comprising at least:

modifying at least one second configuration parameter of at least one second slice dedicated to a second elementary service of a set of services, on the basis of at least one modification of a first configuration parameter of a first slice dedicated to a first elementary service of the set of services.

Thus, advantageously, it is possible, based on the modification of one or more configuration parameters of a network slice (also called slice) of a set of network slices linked in a set of services, for example because they are linked to a more encompassing product or service, or linked to a customer, or linked to a type of service, to modify automatically and quickly the configuration of a plurality of network slices of the set of network slices. More precisely, it is not necessary to take action individually on each of the linked network slices, which requires a rebound adaptation of the configuration.

Advantageously, the method makes it possible to reduce the latency time for adapting network slices that are dependent on a network slice whose configuration parameter has just been modified.

Another advantage of the method is to reduce the costs associated with the resources used during a modification of a network slice. Indeed, in general, during modification of a configuration parameter of a network slice, it is necessary to monitor the rebound impact of this modification on the other network slices whatever they may be, and then it is necessary to subsequently calculate a modification of one or more other network slices. The method of the present description advantageously only requires monitoring a modification of a configuration parameter of a first slice and then deducing therefrom the modification of a configuration parameter of a second slice, thus greatly reducing the monitoring resources and the costs of calculating the adaptation of the other network slices.

"Configuration parameter" (or parameter) is understood to mean a variable contributing to the specification of the network's need for the elementary service to be provided (e.g. to a set of terminals), and therefore provided by the network slice. Thus, modifying a configuration parameter is understood to mean modifying a value of a configuration parameter.

In one or more embodiments, the modification of the at least one second configuration parameter of the at least one second network slice may be carried out as soon as a first configuration parameter of a first network slice is modified.

Thus, advantageously, the synchronized modification of one or more network slice(s) following the modification of at least one first configuration parameter of a first network slice can be carried out without delay, thus reinforcing the reduction in latency described above.

In one or more embodiments, the method for synchronized adaptation may further comprise:
    detecting a modification of a first configuration parameter of a first network slice dedicated to a first elementary service of the set of services, this detection triggering the modification of the at least one second configuration parameter of the at least one second network slice.

Thus, advantageously, each network slice can adapt its configuration parameters autonomously, i.e. without receiving a modification command from another network slice or without an exchange of information between network slices, since each network slice associated with a respective elementary service is able to detect any modification of configuration parameter(s) of network slice(s).

According to one or more embodiments, the modification may comprise an identification of a predetermined modification rule associated with a modification of a first configuration parameter of a first network slice, suitable for being used to modify a second configuration parameter of a second network slice.

Predetermined modification rule (or modification rule) can be understood to mean the manner in which a configuration parameter, i.e. a value of a configuration parameter, of a network slice can be modified after modification of another configuration parameter, i.e. a value of another parameter of another network slice.

In particular, a predetermined modification rule comprises an association of a modification of a configuration parameter, i.e. a modification of a value of a configuration parameter, of a network slice, with a modification of another configuration parameter, i.e. a modification of a value of another parameter, of another network slice. In particular, this association may be stored in a modification rule base. For example, this modification rule base may be specific to each network slice or may be accessible for all the network slices. Thus, when a modification of a configuration parameter, i.e. a value of a configuration parameter, of a network slice is carried out, the modification is looked up in the modification rule base. The corresponding modification rule in the base then indicates the modification of another configuration parameter of another associated network slice, i.e. either a new value or a modification to be made to a value of another parameter, to be applied to this other network slice.

In one or more embodiments, the method may further comprise:
    modifying at least one third configuration parameter of at least one third network slice dedicated to a third elementary service of the set of services, on the basis of at least one modification of a first configuration parameter of a first network slice dedicated to a first elementary service of the set of services.

Thus, advantageously, it is possible to further optimize the propagation of the synchronized adaptation of network slices dedicated to a service.

Furthermore, in one or more embodiments, the modification may be carried out according to at least one predetermined modification rule which may be selected from at least one set of predetermined rules.

In one or more embodiments, the first configuration parameter may be selected among: a quality of service (QOS), a level of security, a cost of service, a speed, a latency, a number of connected objects, an activation/deactivation.

Activation/deactivation may be understood to mean the activation/deactivation of the network slice or of another network slice. In the event that the implementation of the network slices allows for assigning or allocating a network slice to an elementary service, the activation/deactivation of the network slice is carried out on the previously assigned/allocated network slices. The resources allocated to a network slice assigned to an elementary service will remain on standby as long as the network slice is deactivated and will be placed in operation when the network slice is activated, thus reducing costs in terms of the use of resources (in particular energy costs) of the network slice.

According to one or more embodiments, the modification may be carried out using at least one adaptation function among: an arithmetic function, a maximum, a minimum, a presence of conditions, a Boolean function.

The adaptation function may correspond to a predetermined modification of another network slice of the telecommunication network on the basis of a modification of a given slice, by following one or more predetermined modification rules. For example, a modification rule may identify the second parameter of the other network slice to be modified, and the adaptation function may be given by another modification rule defining how the second parameter is to be modified.

The set of modification rules and/or adaptation functions between one or more of the first configuration parameters of a first network slice and one or more of the second configuration parameters of a second network slice constitutes a link, also called a dependency, between the first network slice and the second network slice.

In one or more embodiments, the modification may be carried out using a one-way or two-way adaptation function.

One-way can be understood to mean a single direction of application of an adaptation function, or even of a modification rule, between two network slices. Thus, one or more second configuration parameters of the second network slice can be modified using the method for synchronized adaptation of the present description, on the basis of a modification of one or more first configuration parameters of the first network slice, but not the reverse.

Two-way can be understood to mean two directions of application (e.g. reciprocal) of an adaptation function, or even of a modification rule, between two network slices.

In particular, a second modified configuration parameter of a second network slice is obtained by applying a given adaptation function to a first modified configuration parameter of a first network slice. And, a first modified configuration parameter of a first network slice is obtained by applying the reverse function (in the mathematical sense) of the given adaptation function to a second modified configuration parameter of a second network slice.

In the particular case of using a modification rule base, this means that a modification of a first configuration parameter of a first network slice leads to the modification of a second configuration parameter of a second network slice according to the corresponding modification rule in the modification rule base and, conversely, a modification of a second configuration parameter of a second network slice causes a modification of a first configuration parameter of a first network slice according to the corresponding modification rule in the modification rule base.

According to one or more embodiments, the two-way adaptation function may be defined by two different sets of predetermined modification rules, or by a single set of predetermined modification rules.

For example, in one practical case it may be provided that a determination of a first configuration parameter to be modified of a first network slice dedicated to a first elementary service of the set of services involves steps of:
- estimating at least one network overload value for a predetermined duration,
- comparing the estimated overload value with a threshold value or with a range of threshold values, if the estimated overload value is greater than the threshold value or if the overload value is within the threshold value range, determining at least one first configuration parameter of a first network slice to be modified.

Typically, the estimated overload value may be based on network data selected among:
- a number of connections to the network;
- a number of requests for connection to the network;
- a request for speed on the network.

Number of connections can be understood to mean a number of terminals simultaneously connected to the network, or a number of objects (IoT for "internet of things") simultaneously connected to the network. It can also be understood as any device simultaneously connected to the network.

Number of requests for connection to the network can be understood to mean the number of requests for connecting to the network that are simultaneously issued from one or more terminals.

Request for speed on the network can be understood to mean a data speed required by one or more terminals.

Thus, advantageously, it may be possible to adapt a set of network slices in a fully automated manner (i.e. without any manual intervention) as soon as a first configuration parameter of a first network slice (i.e. expression of need of a private virtual network) possibly following detection of a need of the first elementary service associated with this first network slice.

Thus, a same first network slice associated with a first elementary service of a set of services may be linked to several network slices (second, third, fourth . . . network slices) associated with other elementary services (second, third, fourth . . . elementary services) of a same set of services.

The implementation of the method for synchronized adaptation thus triggers, during a modification of a first configuration parameter of a first network slice, a modification of a second configuration parameter of a second slice network, and optionally a fourth configuration parameter of a fourth network slice. The modified parameters are thus not necessarily associated with successive slices. In particular, the first modified configuration parameter triggering modification of the second configuration parameter may be either the same or different first configuration parameter than the one triggering the modification of the fourth configuration parameter.

Furthermore, in one example, the modification of the second configuration parameter of the second network slice and/or the modification of the fourth configuration parameter of the fourth network slice may trigger, by applying the method for synchronized adaptation of the present description, a modification of a third configuration parameter of the third network slice.

Optionally, when the modification of the second configuration parameter and the modification of the fourth configuration parameter are triggered by two distinct first configuration parameters of the first network slice, their modifications (the modification of the second configuration parameter and the modification of the fourth configuration parameter) may trigger the modification of two distinct third configuration parameters of the third network slice.

Another aspect of the present description relates to a device for synchronized adaptation of a virtual subset of a telecommunication network referred to as a "network slice", comprising a processing circuit configured for implementing the method.

In another aspect, a computer program is provided comprising program code instructions for executing the method.

An aspect of the present description also relates to a non-transitory storage medium readable by a device for synchronized adaptation on which are stored the code instructions of a computer program according to the present description.

BRIEF DESCRIPTION OF THE DRAWINGS

Other features, details, and advantages will become apparent upon reading the detailed description below, and upon analyzing the appended drawings, in which.

DETAILED DESCRIPTION OF CERTAIN ILLUSTRATIVE EMBODIMENTS

For the most part, the drawings and the description below contain elements that are certain in nature. Therefore not only may they serve to provide a better understanding of the present disclosure, but where applicable they also contribute to its definition.

Figure 1:
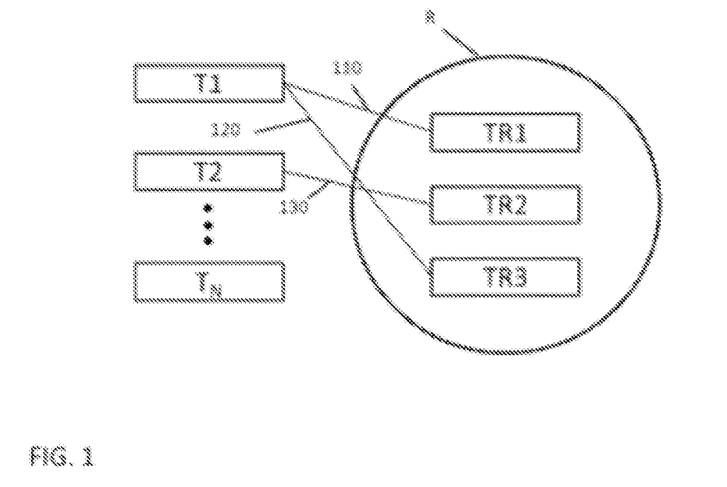
FIG. 1 schematically illustrates several terminals and an associated device for accessing a telecommunication network R in one or more embodiments.

FIG. 1 schematically illustrates one or more terminals T1; T2; $T_N$ and an associated device for accessing a telecommunication network R in one or more embodiments.

"Terminal" can be broadly understood to mean any electronic or computer device that can be connected to the telecommunication network R, for example a server, a computer, a mobile phone, or some other device. The terminal 1 may itself be connected to other electronic or computer devices.

A device for managing the telecommunication network R may advantageously use a virtualization of network functions to implement a plurality of slices on a single physical network infrastructure.

Such a network slicing technique can thus enable the device for managing the telecommunication network R to offer independent and "tailor-made" virtual private networks, capable of providing optimized solutions for highly varied needs with a wide variety of constraints in terms of functionality and performance, without reserving the physical network infrastructure in advance. This is why network slices offering virtual private networks are defined on the basis of an expression of network needs.

The device for managing the telecommunication network R may offer, to terminal 1 or to a plurality of terminals T2; $T_N$, a first network slice TR1, a second network slice TR2, and a third network slice TR3 for access to different services with different network parameters. However, this embodiment is not limiting and the device for managing the telecommunication network R may offer a lower number of network slices, for example only two slices, or a higher number.

One or more network slices TR1, TR2, TR3 may thus be used by the terminals T1, T2, and $T_N$. The terminals T1, T2, and $T_N$ may be connected simultaneously to all the network slices, or may be partially connected, or may be connected successively to each slice.

For example, for partial, terminal T1 can be connected 110 to network slice TR1 and be connected 120 to network slice TR3, but cannot be connected to network slice TR2. Terminal T2 can be connected 130, for example, only to slice TR2.

Each network slice TR1, TR2, TR3 may be adapted to provide an elementary network service of a more encompassing service (or more encompassing network service) for one or more terminals.

Figure 2:
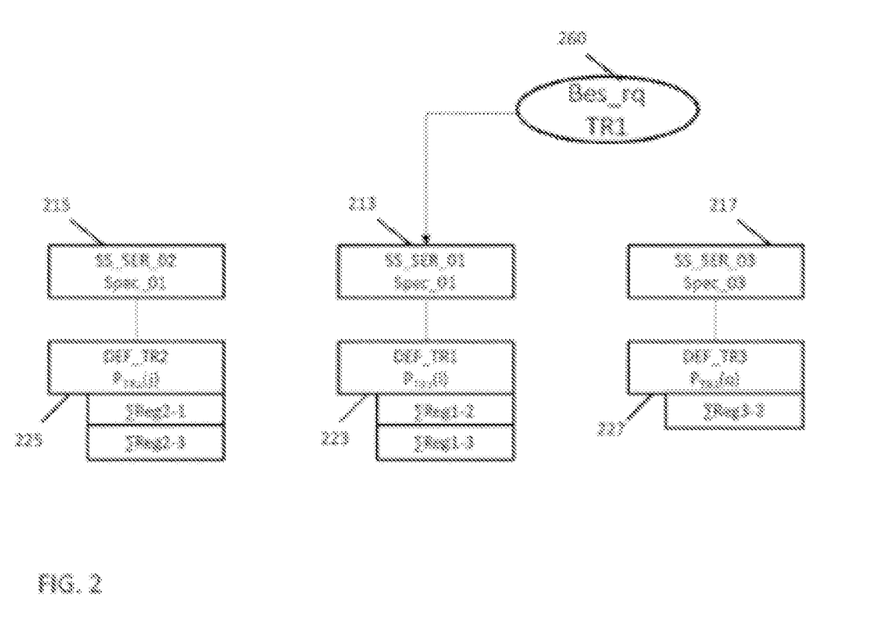
FIG. 2 schematically illustrates the implementation of a more encompassing service (e.g. by an operator or a user) and an associated device for accessing a telecommunication network R according to a first embodiment.

FIG. 2 schematically illustrates the implementation of such a more encompassing service (e.g. by an Operator or a Major Account customer) and an access device associated with a telecommunication network R according to a first embodiment.

A more encompassing service to be provided, for example for a set of terminals or for different terminals, can generally be defined by a set of specifications or requirements necessary for this more encompassing service to function properly.

Thus, from the specifications, the service can be implemented by a set of one or more elementary services 213; 215; 217 which themselves comprise their own specifications or requirements. The set of elementary services 213; 215; 217 can make it possible to satisfy the need for the more encompassing service to be provided.

For each elementary service associated with its respective specifications, a network slice of the telecommunication network R can be configured by one or more parameters, called "configuration parameters".

Thus, advantageously, a user (e.g. operator, technician, service provider, customer, etc.) configuring a more encompassing service to be provided can use network function virtualization to implement a plurality of slices on a single physical network infrastructure (e.g. the telecommunication network R).

The number of elementary services used of a more encompassing service is not limiting. Indeed, the number of elementary services, and therefore the number of network slices used dedicated to these elementary services, may be higher or lower, depending on the requirements or specifications of the more encompassing service to be provided.

Each network slice may be configured by one or more respective configuration parameters. These configuration parameters may have initial values for setting up the more encompassing service.

Thus, the network slices TR1, TR2, TR3 comprise at least one, advantageously several, configuration parameters (or values of configuration parameters) which differ according to the elementary service respectively provided or to be provided by using the associated network slice.

Network slice TR1 can be defined 223 by a number n of configuration parameters $P_{TR1}(i)$, network slice TR2 can be defined 225 by a number m of configuration parameters $P_{TR2}(j)$, and network slice TR3 can be defined 227 by a number q of configuration parameters $P_{TR3}(q)$.

The number of configuration parameters for configuring a network slice may vary depending on the specifications or requirements of each elementary service, which themselves satisfy the specifications of the more encompassing service. For example, network slice TR1 may comprise a number n=5 of configuration parameters $P_{TR1}(i)$, and network slice TR2 may comprise a number m=10 of configuration parameters $P_{TR2}(j)$.

In one or more embodiments, a configuration parameter may relate to a service functionality of the network slice corresponding to a performance requirement for the elementary service, and therefore a performance requirement for the associated network slice.

In particular, a configuration parameter of a network slice may be selected among: the speed, the geographical coverage of the service, the number of possible connections, the level of security, the latency, or the quality of service.

In addition, in one or more embodiments, a configuration parameter may relate to a functional requirement of an elementary service (and therefore of the network slice associated with this elementary service). Thus, a configuration parameter corresponding to the functional requirements of a network slice may be selected among various requirements relating to the elementary service to be provided, such as the cost of the service for the user, or the energy consumption aspect.

In addition to configuration parameters configuring each network slice of an elementary service, one or more predetermined modification rules may be defined in order to establish dependencies (or links) between the different network slices of the telecommunication network (R). One or more modification rules may thus be attached to a network slice.

For example, set ΣReg1-2 may correspond to the set of modification rules (for example in the form of adaptation functions) applicable to the second slice 225 when the first slice 223 is modified (i.e. a configuration parameter value of the first network slice is modified). Set ΣReg2-1 may correspond to the set of modification rules applicable to the first slice 223 when the second slice 225 is modified. Set ΣReg2-1 may correspond, for example, to modification rules in the form of adaptation functions that are the inverse (in the mathematical sense) of the adaptation functions of set ΣReg1-2, or in a possible alternative may correspond to different modification rules (and/or different adaptation functions). Thus, the modification rules (and/or adaptation functions) between two network slices may be two-way.

In addition, the first network slice may also be configured with set ΣReg1-3 corresponding to the set of modification rules applicable to the third slice 227 when the first slice 223 is modified.

According to another example, only one set ΣReg1-3 of modification rules may be defined between the first network slice 223 and the third network slice 227. In this example, a modification of configuration parameters of the third network slice 227 does not lead to modification of configuration parameters of the first network slice 223. Thus, the modification rules (and/or the adaptation functions) between two network slices may be one-way. In this case, the third network slice can be called the "slave", and the first network slice the "master".

Referring to FIG. 2, when a modified value of a configuration parameter of the first slice 223 is detected, a predetermined modification rule of set ΣReg1-2 may be identified and used to modify the value of a second configuration parameter of the second network slice 225.

Modification of a configuration parameter of a network slice may take place because of a need 260, which may or may not be predefined (for example a new need or an unanticipated need).

For example, the response to this need 260 may be an increase in speed, a decrease in latency, or a new quality of service for a specific network slice. Thus, the response will be made by modifying the configuration of this network slice, here network slice 223. It is understood that the modification of the configuration of network slice 225 may for example meet this need if this proves to be more optimal.

The use of one or more predetermined modification rules respectively attached to each network slice of a more encompassing service makes it possible then to adapt the set of network slices of each linked elementary service in a simple and efficient manner.

Thus, advantageously, the configuration of a second network slice may be modified without requiring manual intervention (e.g. by an operator, technician, user, etc.) via the expression of a new need 260.

Figure 3:
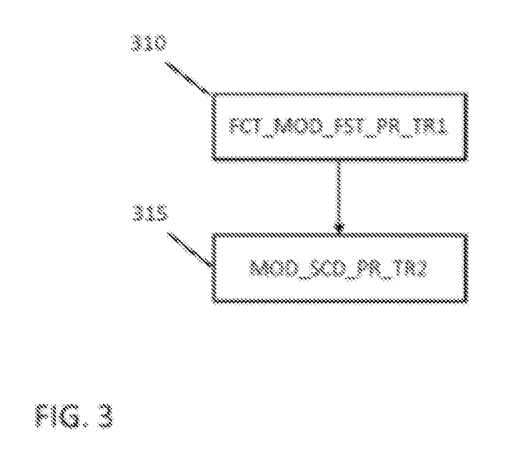
FIG. 3 illustrates an example of synchronized adaptation between two network slices in one or more embodiments.

FIG. 3 illustrates an example of a method for synchronized adaptation of one or more network slices in one or more embodiments.

Thus, when a service need that may or may not be predefined arises, it may be necessary to modify the configuration of a network slice.

A predefined (or scheduled) need may be, for example, a certain configuration of one or more network slices of a more encompassing service, on the basis of a predefined time slot or a predefined time. Scheduling according to a predefined time slot or a predefined time may be implemented directly during initial configuration of the network slices, or ordered remotely (e.g. via a server).

For example, when the time slot is detected, one or more configuration parameters of one or more network slices associated with one or more elementary services of a more encompassing service can be modified, and their modification can lead to the synchronized adaptation of other network slices associated with other elementary services of the same more encompassing service, via one or more predetermined modification rules.

A non-predefined need, or new need, or unanticipated need, may be a need resulting from modification of the external environment (e.g. increase in the number of terminals, need for lower latency or better quality of service).

The modification 310 of a first configuration parameter may correspond to a value of the first configuration parameter transmitted, detected, or entered by a user (e.g. operator, user of the more encompassing service, etc.) for example. This modification may, for example, follow a network overload lasting a predetermined period (as a result of a new need for example) as explained above.

Based on this modified first configuration parameter 310 and/or the modification of the first configuration parameter, meaning for example based on a modification function applied to the first configuration parameter in order to modify it or based on a modification value (the modification value may be a positive or negative integer, decimal, or real number, etc.) added or multiplied to the initial value of the first configuration parameter, it may be possible to determine the second configuration parameter to be modified of the second network slice and to identify 315 a modification to be applied to the second configuration parameter of the second network slice on the basis of the first configuration parameter of the first network slice (and in particular of the modification carried out on this first configuration parameter of the first network slice). The modification to be applied to the second configuration parameter of the second network slice is, in particular, a predetermined adaptation function for adapting the second configuration parameter of the second network slice according to the first configuration parameter of the first slice, or at least a predetermined modification rule between the first configuration parameter and at least one second configuration parameter. The predetermined modification rule may correspond to a dependency (or a link) between the first network slice and the second network slice, for example in the form of an adaptation function for adapting a second configuration parameter of a second network slice according to a first configuration parameter of a first network slice, making it possible to determine both the second configuration parameter of the second network slice concerned by the modification and the modified value of this second configuration parameter.

For example, if the first configuration parameter corresponds to a speed parameter of the first slice, the second configuration parameter may correspond to a speed parameter of a second network slice. And, in this case, modification of the demand for speed of the first network slice leads, by applying the method for synchronized adaptation, to modification of the speed of the second network slice. For example, the link between the two network slices corresponds to an adaptation function in which the speed of the second network slice is a multiple of (for example two times) the speed of the first network slice. Thus, if the demand/requirement for speed for the first network slice increases, then the requirement for speed for the second network slice is adjusted accordingly and increases twice as fast in this example.

According to another example, the second network parameter may be of a different type than the first network parameter. If the first configuration parameter corresponds to a speed parameter of the first slice, the second configuration parameter may correspond to a latency parameter or a number of connected objects parameter of the second network slice.

The predetermined modification rule can make it possible to define the manner in which a configuration parameter of one network slice must be modified based on a modified configuration parameter of another network slice. The predetermined modification rule may comprise, for example, at least one arithmetic function, or Boolean function, or a combination of both.

After identifying the predetermined modification rule to be used between the first configuration parameter and the second configuration parameter, it may be possible to modify 315 the second configuration parameter of the second network slice according to the first predetermined rule and, possibly, according to the initial value of the second configuration parameter.

Figure 4:
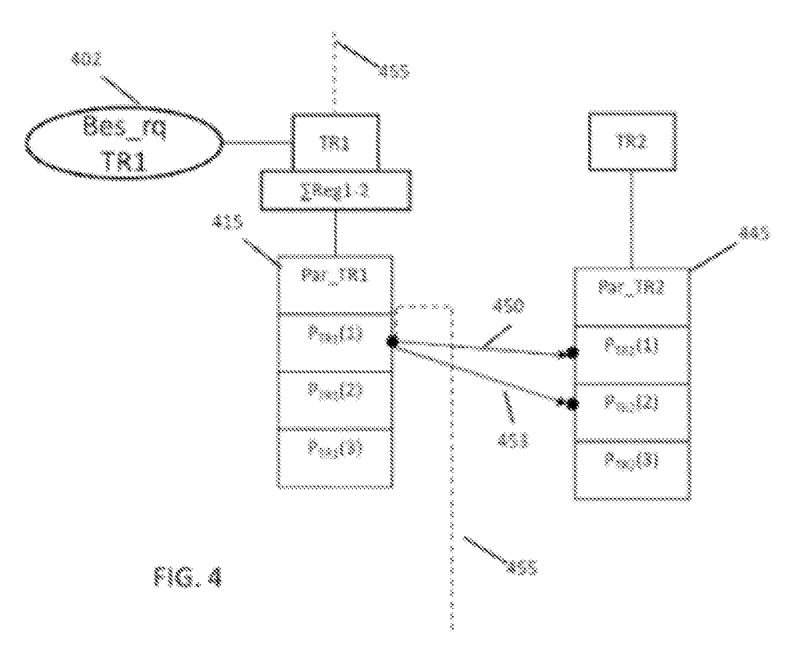
FIG. 4 illustrates an example of synchronized adaptation between two network slices in one or more embodiments.

FIG. 4 illustrates an example of synchronized adaptation between two network slices in one or more embodiments.

Two network slices TR1 and TR2 associated with a respective elementary service may be defined by one or more respective configuration parameters 415; 445 (or respectively defined by a set of configuration parameters).

In addition, the configuration of the elementary services (and therefore of the network slices) may comprise one or more predetermined modification rules defining the various links existing between the network slices.

For example, set ΣReg1-2 may correspond to the set of modification rules applicable to the second slice TR2 (e.g. to the value of a second parameter of the second network slice TR2) when the first slice TR1 is modified, for example when a value of a first configuration parameter of the first network slice is modified. These modification rules may for example take the form of adaptation functions.

Referring to FIG. 4, the configuration parameters (PTR) of the first network slice and of the second network slice may be, for example, a speed ($P_{TR1}(1)$ and $P_{TR2}(1)$), a latency ($P_{TR1}(2)$ and $P_{TR2}(2)$), and a number of connected objects allowed ($P_{TR1}(3)$ and $P_{TR2}(3)$). For each configuration parameter, a value may, for example, be associated with it.

Thus, to meet an identified need 402 on a first network slice (e.g. which may or may not be programmed/predefined), for consistency reasons in particular it may be necessary to modify the configuration of the more encompassing service, and therefore to modify the configuration of other network slices associated with other elementary services implementing the more encompassing service. For example, the speed value of a first configuration parameter $P_{TR1}(1)$ of network slice TR1 may be increased from a value of 1 Mbps to a value of 2 Mbps.

If the predetermined modification rule of set ΣReg1-2 linking configuration parameter $P_{TR1}(1)$ and configuration parameter $P_{TR2}(1)$ is an arithmetic adaptation function, for example a multiplication by a factor T=2, then at the moment when value $P_{TR1}(1)$ is modified, value $P_{TR2}(1)$ can be multiplied 450 by this factor T, i.e. 4 Mbps.

If the previous predetermined modification rule further comprises a maximum speed value not to be exceeded for network slice TR2, for example 3 Mbps, then at the moment when value $P_{TR1}(1)$ is modified, value $P_{TR2}(1)$ multiplied by factor T can be set to 3 Mbps instead of 4 Mbps.

According to another example, modification of configuration parameter $P_{TR1}(1)$ can also lead 455 to modification of one or more configuration parameters of another network slice according to one or more modification rules that belong to different sets of modification rules (not represented in FIG. 4).

As another example, the predetermined modification rule may be in the form of an adaptation function comprising one or more conditions. For example if, following the need, the modification of the value of speed parameter $P_{TR1}(1)$ is greater or less than a certain value, then the configuration parameter(s) of network slice TR2 can be modified 450; 453 according to different values on the basis of input conditions (e.g. greater or lesser value).

For example, if Modification($P_{TR1}(1)$)>5 Mbps, then $P_{TR2}(1)$=4 Mbps else $P_{TR2}(1)$=2 Mbps.

According to another example, if Modification($P_{TR1}(1)$) >5 Mbps, then $P_{TR2}(1)$=4 Mbps else $P_{TR2}(2)$ (i.e. latency) =10 milliseconds.

According to an alternative, it may also be possible to define a set ΣReg2-1 of modification rules (not represented in FIG. 4) applicable to network slice TR1 when network slice TR2 is modified (e.g. a value of a first parameter of second network slice TR2). Set ΣReg2-1 may comprise modification rules, for example in the form of adaptation functions, corresponding to the inverse of the adaptation functions of set ΣReg1-2, or may comprise different modification rules, or different adaptation functions. For example, the modification rules of set ΣReg1-2 may relate to speed and latency, and the modification rules of set ΣReg2-1 may relate to speed, security, and cost.

It is thus possible to define different predetermined modification rules when the parameter modifications occur at network slice TR1 or at network slice TR2.

Figure 5:
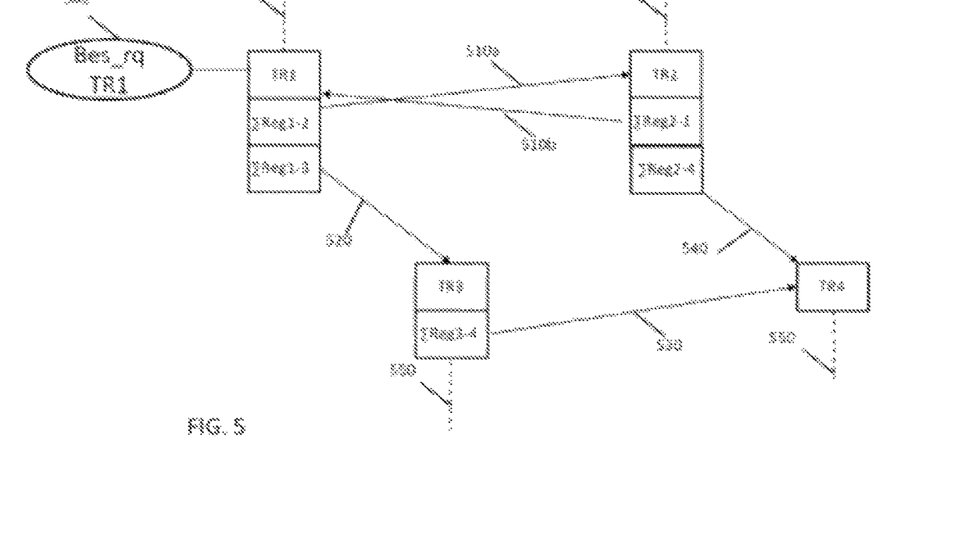
FIG. 5 illustrates an example of synchronized adaptation of a service between multiple network slices in one or more embodiments.

FIG. 5 illustrates an example of synchronized adaptation of a service between multiple network slices in one or more embodiments.

Thus, four network slices TR1, TR2, TR3, TR4 (each associated with a respective elementary service) may be configured by one or more configuration parameters (or sets of one or more configuration parameters) for each network slice, as described above.

The set of network slices enables the implementation of a more encompassing service.

In addition, the configuration of the elementary services (and therefore of the network slices) may comprise one or more predetermined modification rules defining the links (or interactions) between the different network slices. Respective sets of modification rules can thus be attached to each network slice of the more encompassing service.

For example, set ΣReg1-2 can correspond to the set of modification rules 510a applicable to second network slice TR2 when first network slice TR1 is modified. Set Reg2-1 can correspond to the set of modification rules 510b applicable to first network slice TR1 when second network slice TR2 is modified. Set ΣReg1-3 can correspond to the set of modification rules 520 applicable to third network slice TR3 when first network slice TR1 is modified, etc.

In addition, each network slice may also interact 550 with one or more other network slices by means of different sets of modification rules (not shown in FIG. 5).

It is thus possible to adapt a set of network slices in a synchronized manner by applying one or more configuration parameter modifications to a limited number of network slices comprised in a set of network slices.

By modifying only a limited number of network slices, the configuration parameters of the other network slices can be modified via a cascade (or avalanche) effect.

For example, following a need (e.g. which may or may not be predefined) 502, modification of a configuration parameter of network slice TR1 can make it possible, by means of the modification rules for TR1), to modify network slices TR3 and TR2.

The configuration parameters of network slices TR2 and TR3 can thus be modified automatically by following the predetermined rules and without manual intervention. These same network slices TR2 and TR3 will themselves, by means of the sets of modification rules, make it possible to modify 530; 540 network slice TR4.

Thus, based on the modification of configuration parameters of a single network slice (TR1), it can be possible to modify three other network slices (TR2; TR3; TR4) automatically, as well as a plurality of network slices that can interact via the links 550 (one-way or two-way).

Figure 6:
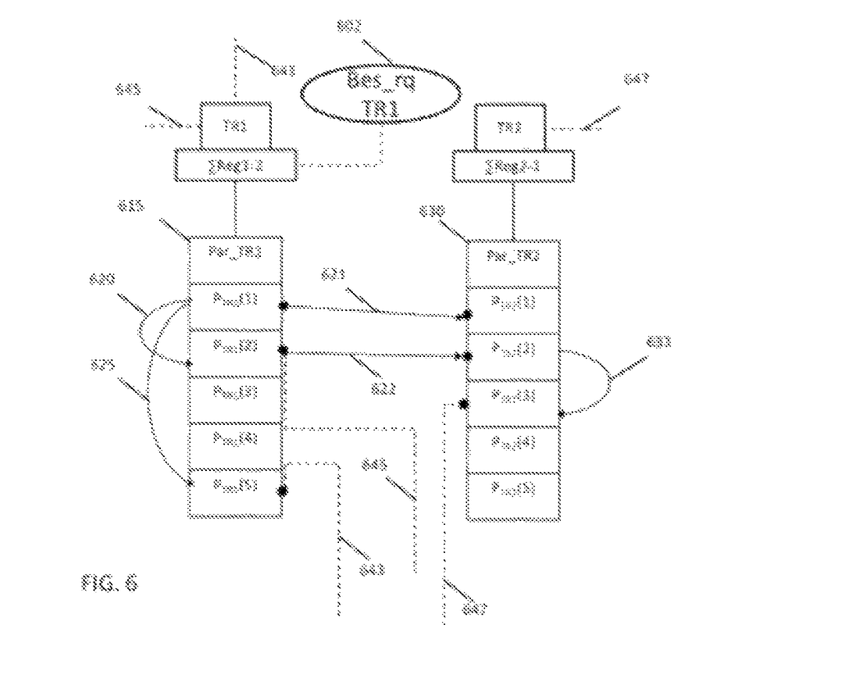
FIG. 6 illustrates another example of synchronized adaptation between two network slices in one or more embodiments.

FIG. 6 illustrates another example of synchronized adaptation between two network slices in one or more embodiments.

Two network slices TR1 and TR2 associated with a respective elementary service may be defined by one or more respective configuration parameters 615; 630 (or respectively defined by a set of configuration parameters).

Additionally, a respective set of modification rules may be attached to each network slice as previously described in FIG. 4 and FIG. 5.

Network slice TR1 may additionally comprise interactions 643; 645 (one-way or two-way) with network slices other than network slice TR2. Similarly, slice TR2 may additionally comprise an interaction 647 with a network slice other than network slice TR1. These interactions may be implemented by means of one or more respective modification rules, or different respective sets of modification rules attached to each network slice (not shown in FIG. 6).

The configuration parameters (PTR) of the first network slice and of the second network slice may be, for example, a speed $P_{TR1}(1)$; $P_{TR2}(1)$, a latency $P_{TR1}(2)$; $P_{TR2}(2)$, a permitted number of connected objects $P_{TR1}(3)$; $P_{TR2}(3)$, a degree (or level) of security $P_{TR1}(4)$; $P_{TR2}(4)$, or a cost $P_{TR1}(5)$; $P_{TR2}(5)$. For each configuration parameter, a value may, for example, be associated with it.

As described above, depending on the respective modification rules (or respective sets of modification rules) attached to each network slice, modification of a configuration parameter of network slice TR1 can lead to modification of a configuration parameter of network slice TR2. For example, following a need 602, a modification of configuration parameter $P_{TR1}(1)$ of slice TR1 can cause 621 the modification of configuration parameter $P_{TR2}(1)$ of network slice TR2.

This same modification of a configuration parameter of slice TR1 may also already cause a modification of one or more configuration parameters of the same network slice TR1, thus creating an interdependency between the configuration parameters.

For example, modification of the speed value of configuration parameter $P_{TR1}(1)$ may mechanically cause 620 a modification of the value of latency parameter $P_{TR1}(2)$ of network slice TR1.

Similarly, increasing the speed value of configuration parameter $P_{TR1}(1)$ may also mechanically cause 625 a modification of parameter $P_{TR1}(5)$ linked to the cost of network slice TR1. Indeed, an increase in the speed of a network slice may be accompanied by an increase in the cost of this network slice.

Depending on the modification rules defined between network slice TR1 and one or more network slices, the modified configuration parameters $P_{TR1}(2)$ and $P_{TR1}(5)$ resulting from modification of parameter $P_{TR1}(1)$ may themselves cause 622 the modification of configuration parameters of other network slices via the various interactions (or links) 643 and 645.

In addition, the configuration parameters of network slice TR2 may themselves comprise interdependencies. For example, modification of configuration parameter $P_{TR2}(2)$ may lead to modification of configuration $P_{TR2}(3)$, which itself causes modification of a configuration parameter of another network slice 647.

According to one example, increasing the speed $P_{TR1}(1)$ of network slice TR1 can lead to a drop in latency $P_{TR1}(2)$ of network slice TR1. This drop in latency can lead to the application of a modification rule to latency parameter $P_{TR2}(2)$, for example corresponding to a maximum latency value not to be exceeded. This maximum value not to be exceeded may cause 633 a modification of parameter $P_{TR2}(3)$ corresponding to the allowed number of connected objects: for example, this number may be reduced.

Example of a scenario with synchronized adaptation of network slices.

A hospital can manage its various network needs (e.g. communication) for different services by means of network slices (TR1, TR2, TR3, TR4): doctors working out of the office, remote patient care, connected medical equipment, etc.

It is nighttime, and an incident has just occurred (e.g. fire, multi-car accident, etc.). There are many appalling injuries and there is a tendency towards panic.

The network manager of the hospital reacts immediately by reassessing the configuration of the network slice (TR1) associated with communication for emergency personnel.

Due to the predetermined modification rules (or set of predetermined modification rules) between network slices, other network slices (TR2 and TR3) can then be adapted by following predetermined rules in order to anticipate the large number of upcoming operations (e.g. possibly remotely), as well as to maintain a fault-free quality of communication (e.g. the goal being to maintain communications with a large number of doctors).

Without this synchronized adaptation, the emergency organization may take a much longer time, and manual modification of each network slice (TR1, TR2, TR3, TR4) to meet this non-predefined or unforeseen and urgent need may generate a number of errors (e.g. human error) in the configuration of the network slices.

Another example of a scenario with synchronized adaptation of network slices:

In the organization of his festival out in the middle of the fields, a user (e.g. organizer) may have planned for several network slices (TR1, TR2, TR3, TR4) with different characteristics for different needs including two new features for this year:

- a network slice TR2 for the "very high speed" option, targeting compatible smartphones of users (e.g. those attending the festival)
- a network slice TR3 for all payment transactions concerning the festival, and in particular for the purchase of the "very high speed" option.

Currently the festival is in full swing and there are many more attendees than expected.

Alerted to the unexpected arrival of a well-known person and of the success of the "very high speed" option, the user organizing the festival decides to adapt the parameters of network slice TR2 to meet the demand.

As the user organizing the festival has provided links between network slices TR2 and TR3, and which are associated with one or more sets of predetermined modification rules, the configuration parameters of network slice TR3 can be modified in order to handle all payment transactions correctly.

Alternatively, to meet the needs described in the previous scenarios, it may be possible to determine the configuration parameter(s) to be modified, and under what conditions.

For example, in the case of the second situation, a network overload value (e.g. after the unanticipated need) can be estimated on the basis of a number of simultaneous connections to the network or on the basis of a number of connection requests to the network, or on the basis of the demand for speed by all attendees.

This overload value can be compared to a threshold value or to a threshold value range. For example, if the estimated overload value is within a certain value range, one or more configuration parameters of a first network slice can be determined as well as a modification of each identified parameter in order to respond to this overload.

The entire process is fully automated, and the festival organizer can be relieved of the weight of managing the network for the festival.

Figure 7:
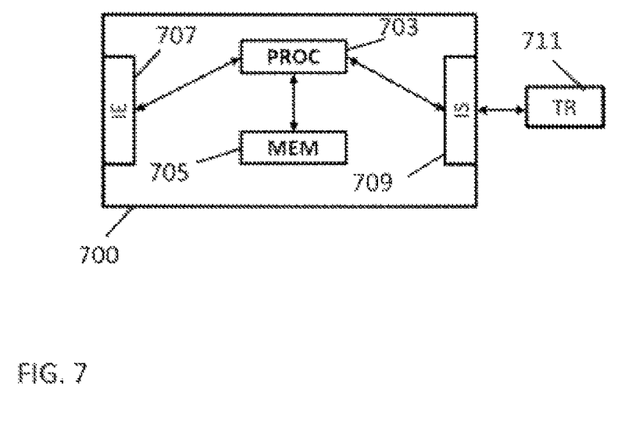
FIG. 7 illustrates a device for synchronized adaptation of a virtual subset of a telecommunication network in one or more embodiments.

FIG. 7 illustrates a device for synchronized adaptation of network slices or slices of a telecommunication network in one or more embodiments.

Thus, the device for synchronized adaptation may comprise a memory 705 for storing program instructions.

The memory 705 may also store data and information useful for implementing the method of the present description. For example, the memory 705 may store one or more modification rules (or sets of modification rules) attached to each network slice of the more encompassing service, for example in the form of an instruction code base.

The program may be executed by a processing circuit 703 configured for implementing the method of the present description.

The processing circuit 703 may be, for example:
- a processor or processing unit suitable for interpreting instructions in computer language; the processor or processing unit may include or may be associated with a memory comprising instructions, or
- the association of a processor/processing unit and a memory, the processor or processing unit being suitable for adaptation in order to interpret instructions in computer language, the memory comprising said instructions, or,
- a programmable electronic chip such as an FPGA chip ("Field Programmable Gate Array").

The device for synchronized adaptation 700 may further comprise an input interface 707 for acquiring one or more configuration parameter modification data items for network slices.

The device for synchronized adaptation 700 may further comprise an output interface 709 for modifying network slice configuration parameters 711 in order to acquire one or more configuration parameter modification data items for network slices of a telecommunication network.

The method of the present description allows automatic and rapid adaptation of the network slices associated with elementary services of a same set of services. In the event that the adaptation uses predefined modification rules or adaptation functions, this makes it possible to gain even more responsiveness and to reduce errors.

Set of services is understood to mean a more encompassing service comprising several elementary services, or elementary services of a same customer or service provider, or elementary services of a same type.

This description is not limited to the embodiments described and represented above, from which other modes and other embodiments can be envisaged without departing from the scope of the present description.

The invention claimed is:

1. A method of synchronized adaptation of a virtual subset of a telecommunication network referred to as a network slice, dedicated to an elementary service of a set of services, a more encompassing service being composed of several elementary services to which separate respective slices are dedicated, the telecommunication network comprising a plurality of network slices, the slices being configured according to a plurality of configuration parameters, wherein the method comprising at least:
   obtaining at least one modification of a first configuration parameter of a first slice dedicated to a first elementary service of a set of services, wherein the at least one modification of the first configuration parameter is a modification of the value of the first configuration parameter of the first network slice;
   identifying a predetermined modification rule associated with the at least one modification of the first configuration parameter of the first network slice, suitable for being used to modify at least one second configuration parameter of at least one second network slice dedicated to a second elementary service of a set of services; and
   modifying the at least one second configuration parameter of the at least one second network slice, on the basis of the at least one modification of the first configuration parameter of the first network slice, comprising modifying the value of the at least one second configuration parameter with the predetermined modification rule and with the value of the first configuration parameter.

2. The method according to claim 1, wherein the modification of the at least one second configuration parameter of the at least one second network slice is triggered by the modification of the first configuration parameter of the first network slice.

3. The method according to claim 1, wherein the method for synchronized adaptation further comprises:
   detecting a modification of the first configuration parameter of the first network slice dedicated to the first elementary service of the set of services, this detection triggering the modification of the at least one second configuration parameter of the at least one second network slice.

4. The method according to claim 1, wherein the method further comprises:
   modifying at least a third configuration parameter of at least a third network slice dedicated to a third elementary service of the set of services, on the basis of at least one modification of the first configuration parameter of the first network slice dedicated to the first elementary service of the set of services.

5. The method according to claim 1, wherein the first configuration parameter is selected among: a quality of service (QOS), a level of security, a cost of service, a speed, a latency, a number of connected objects, an activation/deactivation.

6. The method according to claim 1, wherein the modification is carried out using at least one adaptation function among: an arithmetic function, a maximum, a minimum, a presence of conditions, a Boolean function.

7. The method according to claim 1, wherein the modification is carried out using a one-way or two-way adaptation function.

8. The method according to claim 7, wherein the two-way adaptation function is defined by two different sets of predetermined modification rules, or by a single set of predetermined modification rules.

9. An electronic device comprising a processor configured for synchronized adaptation of a virtual subset of a telecommunication network referred to as a network slice, dedicated to an elementary service of a set of services, a more encompassing service being composed of several elementary services to which separate respective slices are dedicated, the telecommunication network comprising a plurality of network slices, the slices being configured according to a plurality of configuration parameters, the electronic device for synchronized adaptation comprising the processor being configured to:

obtain at least one modification of a first configuration parameter of a first slice dedicated to a first elementary service of a set of services, wherein the at least one modification of the first configuration parameter is a modification of the value of the first configuration parameter of the first network slice;

identify a predetermined modification rule associated with the at least one modification of the first configuration parameter of the first network slice, suitable for being used to modify at least one second configuration parameter of at least one second network slice dedicated to a second elementary service of a set of services; and modify the at least one second configuration parameter of the at least one second network slice, on the basis of the at least one modification of the first configuration parameter of the first network slice, comprising modifying the value of the at least one second configuration parameter.

10. The electronic device according to claim 9, further comprising an input interface for acquiring one or more configuration parameter modification data items for network slices.

11. The electronic device according to claim 9, further comprising an output interface for modifying network slice configuration parameters in order to acquire one or more configuration parameter modification data items for network slices of a telecommunication network.

12. A processing circuit comprising a processor and a memory, the memory storing program code instructions of a computer program for executing the method according to claim 1.

13. A non-transitory storage medium readable by the device for synchronized adaptation on which are stored code instructions of a computer program according to claim 10.

14. The method according to claim 1, additionally comprising applying the identified modification rule to modify a parameter value in the second slice as a function of the parameter value in the first slice.

15. The method according to claim 1, wherein the identified modification rule further modifies the parameter value in the second slice according to an initial parameter value of the second slice.

16. The method according to claim 1, wherein the identified modification rule comprises an adaptation function including one of an arithmetic function, a Boolean function and a combination of the arithmetic function and the Boolean function.

* * * * *

UNITED STATES PATENT AND TRADEMARK OFFICE
CERTIFICATE OF CORRECTION

| | |
|---|---|
| PATENT NO. | : 12,137,034 B2 |
| APPLICATION NO. | : 17/784606 |
| DATED | : November 5, 2024 |
| INVENTOR(S) | : Chantal Guionnet et al. |

It is certified that error appears in the above-identified patent and that said Letters Patent is hereby corrected as shown below:

In the Specification

Column 1, Line no. 55, delete "linked toloT" and insert -- linked to IoT --.

Column 4, Line no. 10, delete "(QOS), a" and insert -- (QoS), a --.

In the Claims

Column 16, Line no. 47, Claim 5, delete "(QOS), a" and insert -- (QoS), a --.

Signed and Sealed this
Eleventh Day of March, 2025

Coke Morgan Stewart
*Acting Director of the United States Patent and Trademark Office*